United States Patent
Agrawal et al.

(10) Patent No.: US 8,954,429 B2
(45) Date of Patent: Feb. 10, 2015

(54) METHODS, SYSTEMS, AND COMPUTER PROGRAM PRODUCTS FOR INTEGRATED WORLD WIDE WEB QUERY CLASSIFICATION

(75) Inventors: Ritesh Jitendra Agrawal, Dublin, CA (US); Irwin King, Orinda, CA (US); Remi Zajac, Oakland, CA (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 214 days.

(21) Appl. No.: 13/559,228

(22) Filed: Jul. 26, 2012

(65) Prior Publication Data
US 2014/0032536 A1 Jan. 30, 2014

(51) Int. Cl.
*G06F 17/30* (2006.01)
(52) U.S. Cl.
USPC ............ 707/731; 707/747; 707/767; 707/768
(58) Field of Classification Search
USPC ......... 707/708, 747, 713, 731, 759, 763, 765, 707/767, 768
See application file for complete search history.

(56) References Cited

U.S. PATENT DOCUMENTS

| 8,190,601 B2 * | 5/2012 | Ahari et al. | 707/722 |
| 2010/0082615 A1 * | 4/2010 | Clinchant et al. | 707/728 |
| 2010/0293048 A1 * | 11/2010 | Singolda et al. | 707/748 |

* cited by examiner

*Primary Examiner* — Marc Filipczyk
(74) *Attorney, Agent, or Firm* — Cantor Colburn LLP

(57) ABSTRACT

Implementing query classification includes receiving a core term from a search query responsive to execution of a first module. The first module searches a table for the core term and yields a first result. The query classification also includes receiving a second result from the search query responsive to execution of a second module. The second module searches an index of terms that are mapped to documents and corresponding categories in the index. The second result is indicative of one of the corresponding categories in the index based on a probability score. Upon determining the first result is a category associated with the core term in the table, the query classification also includes calculating a weighted average for the first result and the second result. The calculation yields a third result. The query classification further includes transmitting the third result to a computer device that generated the query.

14 Claims, 2 Drawing Sheets

METHODS, SYSTEMS, AND COMPUTER PROGRAM PRODUCTS FOR INTEGRATED WORLD WIDE WEB QUERY CLASSIFICATION

BACKGROUND

The present disclosure relates generally to World Wide Web query classification, and more particularly, to methods, systems, and computer program products for integrated World Wide Web query classification.

Web query classification refers to the task of classifying web queries into predefined categories. Some web queries are difficult to classify, particular those that contain few words, as they do not yield rich sets of textual features that are typically needed to provide effective classifications. Even those queries having many words can yield ineffective search results depending on the type of query classification method used.

BRIEF SUMMARY

Exemplary embodiments include a method for implementing query classification. The method includes receiving, at a computer, a core term yielded from a search query responsive to execution of a first module on the search query. The first module searches a table for the core term and yields a first result. The method also includes receiving a second result yielded from the search query responsive to execution of a second module on the search query. The second module searches an index of terms that are mapped to documents and corresponding categories in the index. The second result is indicative of one of the corresponding categories in the index based on a probability score. Upon determining the first result is a category associated with the core term in the table, the method also includes calculating a weighted average for the first result and the second result. The calculation yields a third result. The method further includes transmitting the third result to a computer device that generated the search query.

Exemplary embodiments also include a system for implementing query classification. The system includes a computer processor and logic executable by the computer processor. The logic implements a method. The method includes receiving a core term yielded from a search query responsive to execution of a first module on the search query. The first module searches a table for the core term and yields a first result. The method also includes receiving a second result yielded from the search query responsive to execution of a second module on the search query. The second module searches an index of terms that are mapped to documents and corresponding categories in the index. The second result is indicative of one of the corresponding categories in the index based on a probability score. Upon determining the first result is a category associated with the core term in the table, the method also includes calculating a weighted average for the first result and the second result. The calculation yields a third result. The method further includes transmitting the third result to a computer device that generated the search query.

Exemplary embodiments further include a computer program product for implementing query classification. The computer program product tangibly embodied on a compute readable storage medium. The computer program product includes instructions for causing a computer to implement a method. The method includes receiving a core term yielded from a search query responsive to execution of a first module on the search query. The first module searches a table for the core term and yields a first result. The method also includes receiving a second result yielded from the search query responsive to execution of a second module on the search query. The second module searches an index of terms that are mapped to documents and corresponding categories in the index. The second result is indicative of one of the corresponding categories in the index based on a probability score. Upon determining the first result is a category associated with the core term in the table, the method also includes calculating a weighted average for the first result and the second result. The calculation yields a third result. The method further includes transmitting the third result to a computer device that generated the search query.

Other systems, methods, and/or computer program products according to embodiments will be or become apparent to one with skill in the art upon review of the following drawings and detailed description. It is intended that all such additional systems, methods, and/or computer program products be included within this description, be within the scope of the exemplary embodiments, and be protected by the accompanying claims.

BRIEF DESCRIPTION OF DRAWINGS

Referring now to the drawings wherein like elements are numbered alike in the several FIGURES.

The detailed description explains the exemplary embodiments, together with advantages and features, by way of example with reference to the drawings.

DETAILED DESCRIPTION OF EXEMPLARY EMBODIMENTS

Exemplary embodiments facilitate the classification of World Wide Web (also referred to herein as WWW or Web) queries in order to increase the effectiveness of Web search query results. The exemplary Web query classification processes utilize a combination of techniques, and features of these techniques are integrated to produce an output that offers complementary precision and recall for associated queries. One technique is referred to herein as an enrichment process that utilizes minimal training data and can be easily deployed in situations where target categories are in flux. The second technique is a centroid, or reductionist, approach that offers greater precision in its output than the first technique, but may result in a lower number of desired search results than the first technique. The exemplary Web query classification integrates features of both of these techniques, and includes a feedback loop between the two techniques that increases the precision and recall otherwise offered separately by each technique.

Figure 1:
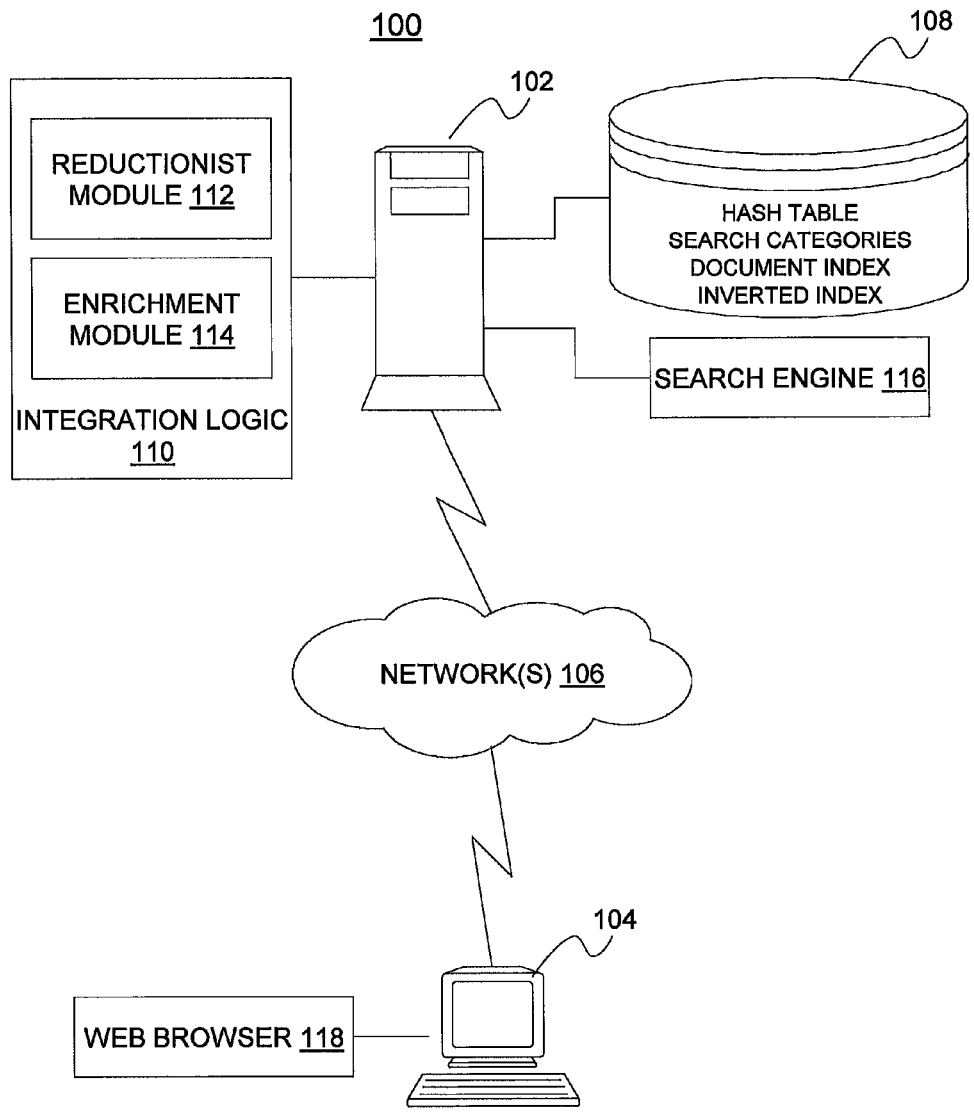
FIG. 1 depicts a block diagram of a system upon which query classification processes may be implemented in an exemplary embodiment.

Turning now to FIG. 1, a system upon which query classification processes may be implemented will now be described in an exemplary embodiment. The system 100 of FIG. 1 includes a host system computer 102 communicatively coupled to a client system 104 via one or more networks(s) 106.

The host system computer 102 refers to a network entity that provides information (e.g., in response to requests, queries, searches, etc.) to requesting individuals. The host system 102 depicted in FIG. 1 may be implemented using one or more servers operating in response to a computer program stored in a storage medium accessible by the server(s). As shown in FIG. 1, the host system computer 102 is communicatively coupled to a storage device 108 and may provide access to information in the storage device 108 to individuals. The host system computer 102 also includes a search engine 116.

Storage device 108 stores a variety of information including, e.g., hash tables, search category records, document indices, and inverted indices as will be described further herein. Storage device 108 may be implemented using a variety of devices for storing electronic information. It will be understood that the storage device 108 may be implemented using memory contained in the host system computer 102 or may be a separate physical device. The storage device 108 is logically addressable as a consolidated data source across a distributed environment that includes network(s) 106. Information stored in the storage device 108 may be retrieved and manipulated via the host system computer 102.

The client system 104 sends requests for information (e.g., search queries) over the networks 106 to the host system computer 102. The client system 104 executes one or more applications including a Web browser 118.

The client system 104 may be a personal computer or desktop device, or may be a portable device such as a laptop, smartphone, or similar wireless communications device. While only one client system 104 is shown in FIG. 1 for ease of illustration, it will be understood that any number of client systems 104 may be employed in realizing the advantages of the exemplary embodiments described herein.

The network(s) 106 may be any type of known networks including, but not limited to, a wide area network (WAN), a local area network (LAN), a global network (e.g. Internet), a virtual private network (VPN), an intranet, or a combination thereof. The network(s) 106 may be implemented using wireless network technologies or any kind of physical network implementation known in the art.

As shown in the system of FIG. 1, host system computer 102 is executing integration logic 110 for implementing the exemplary query classification processes. The integration logic 110 communicates and collaborates with a reductionist module 112 and an enrichment module 114 to perform the exemplary processes described herein. The host system computer 102 also includes a search engine 116.

A process performed by the reductionist module 112 may utilize a centroid algorithm that parses a search query to identify a core term. The core term refers to a term in a query determined to be most significant in facilitating targeted search results. For example, if the search query is "Italian pizza restaurant," the core term may be "restaurant." If the search query is "private school k12," the core term may be "school." The centroid algorithm may use a natural language parser to identify different parts of speech tags in the query. For example, using the Italian pizza restaurant example above, the parts of speech may be <Noun-Adjective>Italian<Noun-Adjective><Noun>Pizza</Noun><Noun>Restaurant</Noun>. The algorithm extracts all of the noun parts and selects the noun that has the highest frequency of occurrence in the sampled data. In a training phase implemented by the reductionist module 112, search queries are manually assigned to categories, whereby the categories refer to generalized topics or classifications of data. Also in the training phase, the centroid algorithm is used to find the core term in each search phrase. Since each query is already assigned to a category, a hash table is built in which the core term has been assigned the category. A key in the hash table may be the core term and the value represents the category.

In a testing phase of the reductionist module 112, the centroid algorithm may be used to extract the core term in a search query and look up the core term in the hash table. The corresponding value (i.e., category), if found, represents the output, which is then sent to an integration process performed by the integration logic 110, as will be described further herein.

A process performed by the enrichment module 114 utilizes WWW to build a word cloud for each of the target categories. These word clouds are then matched to the web query that needs to be classified. A probability of a category given a search query is determined using, e.g., a Bayesian transformation function. In particular, in a training phase, the enrichment module 114 uses categories, e.g., Food and Drink, Consultant, Education, etc. as search terms in the search engine 116 and fetches a top number (N) of results. These categories may be retrieved from the search categories records stored in the storage device 108. The enrichment module 114 processes the fetched documents, e.g., by removing stop words, hyperlinks, non-alphanumeric characters, and HTML tags. The resulting text of each document is assigned a document identifier and a categorical label. The categorical label refers to the category that was searched to produce the resulting documents, as described above. This document (and other processed documents), along with their identifications and assigned categories are stored in the document indices in the storage device 108. The above steps are then repeated for each of the categories in the search categories records.

The enrichment module 114 then indexes a top number (N) documents using the search engine 116. For example, if there are three categories and the top 300 documents for each of the categories are extracted, this would result in 900 documents. Using the search engine, an inverted index is created. The inverted index (stored in the storage device 108) lists for each term found in the documents, a corresponding list of documents that contain the term. In a testing phase, a user (e.g., client system 104) enters a search phrase via the Web browser into the search engine 116. The enrichment module 114 uses the inverted index to find all documents containing the terms in the search phrase. The enrichment module 114 may assign a binary term frequency score to each of the documents indicative of a frequency in which the term is used in the document. These scores are grouped by category and normalized by a total score (i.e., a summation of all of the frequency scores). The scores for each category are multiplied by a prior probability of each category. For example, in a sample of 1,000 queries, there were 200 queries related to Food & Drink and 100 related to the category Automotive. The prior probability of Food & Drink is calculated as 0.2 (or 20%) and that of the Automotive category is 0.1 or 10%. Categories are sorted in descending order, based on the above-calculated score, and the top number N (e.g., 3 or 5) categories are provided to an integration process of the integration logic 110.

Figure 2:
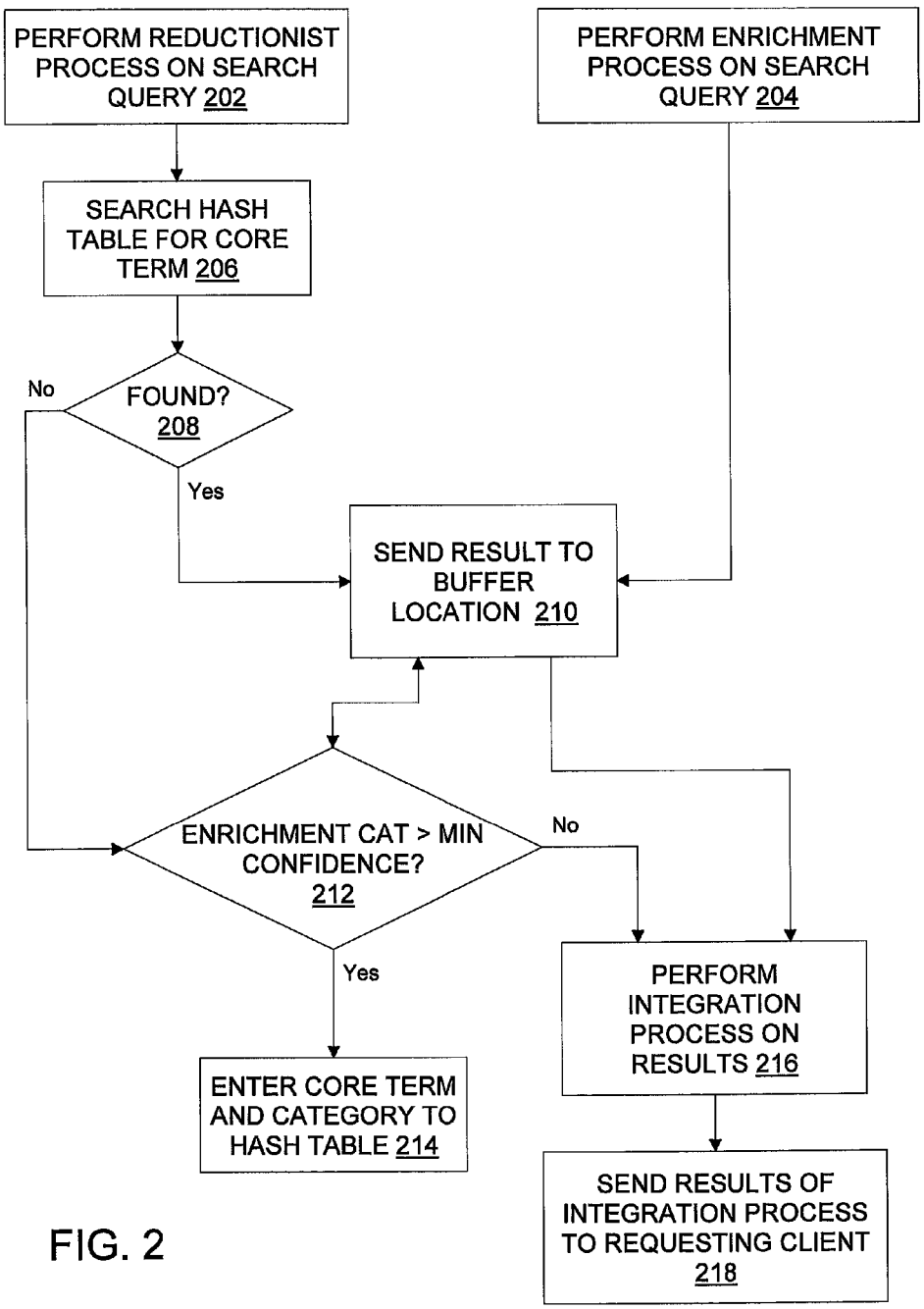
FIG. 2 is a flow diagram of a process for implementing query classification in an exemplary embodiment.

Turning now to FIG. 2, a flow diagram of a process for implementing the exemplary query classification processes will now be described in an exemplary embodiment. The processes of FIG. 2 assume that the host system 102 has received a search query from the client system 104.

At step 202, the reductionist module 112 is executed on the search query. Likewise, at step 204, the enrichment module 114 is executed on the search query, and the results of each of the modules 112 and 114 are held, e.g., in a buffer or cache location in memory of the host system 102 at step 210 until both results of these modules 112 and 114 are ascertained. It will be understood that steps 202 and 204 may be initiated simultaneously once the search query has been received at the host system 102.

At step 206, the reductionist module 206 searches the hash table in the storage device 108 for the core term resulting from the process performed in step 202. At step 208, it is determined whether the core term exists in the hash table in response to the search. The corresponding value (i.e., category), if found, represents the output. If found, the result of the process performed by the reductionist module 112 (e.g., the category, along with the core term) is held in the buffer or cache location in memory of the host system 102 at step 210 until results of both of the modules 112 and 114 are determined.

At step 208, if the core term is not found in the hash table, the integration logic 110 determines if a score (e.g., a probability score) applied to the category ascertained from the result of the process performed by the enrichment module 114 meets a minimum specified confidence level, determined empirically, at step 212. For example, suppose the search query is "Indian restaurants." The core term "restaurant" is not found in the hash table; however, the enrichment module 114 indicates that the category, "Food and Drink" for the term "restaurant" has a probability score of 95%. This indicates that the term "restaurant" has a high probability of turning up in a search under the category "Food and Drink." Thus, the integration logic 110 enters the core term with the category in the hash table at step 214 and maps the core term to the category in the table. In this manner, the next time the core term is searched in the hash table using the reductionist module 112, the associated category, which has been vetted through the enrichment module 114 execution, may be utilized.

In an embodiment, if the core term is not found in the hash table at step 208, the reductionist module 112 may access a lexical database (e.g., Wordnet®) to find synonyms of the core term. The reductionist module 112 may be configured to send the synonyms to the enrichment module 114 for execution (e.g., the original search query is expanded by the enrichment module 114 to include the synonyms), thereby ensuring a wider range of search results.

If, however, the score applied to the category ascertained from the result of the process performed by the enrichment module 114 is less than the minimum specified confidence level at step 212, or alternatively, if the core term has been found in the hash table and the result (i.e., associated category) sent to the buffer location (step 210), an integration process is performed by the logic 110 on the results at step 216. The weighted average may be applied equally to both results or may be biased toward either of the results based on the training data derived, as described above.

As described above, the exemplary embodiments can be in the form of computer-implemented processes and devices for practicing those processes. The exemplary embodiments can also be in the form of computer program code containing instructions embodied in tangible media, such as floppy diskettes, CD ROMs, hard drives, or any other computer-readable storage medium, wherein, when the computer program code is loaded into and executed by a computer, the computer becomes a device for practicing the exemplary embodiments. The exemplary embodiments can also be in the form of computer program code, for example, whether stored in a storage medium, loaded into and/or executed by a computer, or transmitted over some transmission medium, loaded into and/or executed by a computer, or transmitted over some transmission medium, such as over electrical wiring or cabling, through fiber optics, or via electromagnetic radiation, wherein, when the computer program code is loaded into an executed by a computer, the computer becomes an device for practicing the exemplary embodiments. When implemented on a general-purpose microprocessor, the computer program code segments configure the microprocessor to create specific logic circuits.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiments disclosed for carrying out this invention, but that the invention will include all embodiments falling within the scope of the claims. Moreover, the use of the terms first, second, etc., do not denote any order or importance, but rather the terms first, second, etc., are used to distinguish one element from another. Furthermore, the use of the terms a, an, etc., do not denote a limitation of quantity, but rather denote the presence of at least one of the referenced item.

What is claimed is:

1. A method for integrating query categories, comprising:
   receiving a search query;
   executing, at a computer, a reductionist module on the search query to extract a core term from the search query, the core term used to search a hash table that maps core terms to corresponding categories;
   deriving a first result comprising one or more categories from the search of the hash table;
   executing at the computer an enrichment module on the search query to yield a second result, the enrichment module including searching an index of terms that are mapped to documents and corresponding categories in the index, the second result indicative of one of the corresponding categories in the index based on a probability score;
   integrating the first result and the second result to produce a third result, the integrating comprising:
   upon determining the core term is present in the hash table, calculating a weighted average for corresponding values of the first result and the second result based on training data acquired from the execution of the reductionist module and the execution of the enrichment module; and
   upon determining the core term from the search query is not listed in the hash table, and upon determining the probability score of the one of the corresponding categories in the index for the second result meets a minimum defined confidence value, inserting and storing the core term and the one of the corresponding categories in the hash table and mapping the core term to the one of the corresponding categories in the hash table; and
   transmitting the third result to a computer device that generated the search query.

2. The method of claim 1, further comprising:
   providing the core term to the enrichment module, the enrichment module associating a minimum weight to the core term in the execution of the enrichment module.

3. The method of claim 1, further comprising:
   upon determining the core term from the search query is not listed in the hash table, providing a synonym of the core term to the enrichment module, the enrichment module expanding the search query to include the synonym.

4. The method of claim 1, wherein the weighted average is applied equally to the first result and the second result based on training data derived from the execution of the reductionist module and the execution of the enrichment module.

5. The method of claim 1, wherein the reductionist module is executed simultaneously with the enrichment module.

6. A system for integrating query categories, comprising:
a computer processor; and
logic executable by the computer processor, the logic implementing a method, the method including:
receiving a search query;
executing a reductionist module on the search query to extract a core term from the search query, the core term used to search a hash table that maps core terms to corresponding categories;
deriving a first result comprising one or more categories from the search of the hash table;
executing an enrichment module on the search query to yield a second result, the enrichment module including searching an index of terms that are mapped to documents and corresponding categories in the index, the second result indicative of one of the corresponding categories in the index based on a probability score;
integrating the first result and the second result to produce a third result, the integrating comprising:
upon determining the core term is present in the hash table, calculating a weighted average for corresponding values of the first result and the second result based on training data acquired from the execution of the reductionist module and the execution of the enrichment module; and
upon determining the core term from the search query is not listed in the hash table, and upon determining the probability score of the one of the corresponding categories in the index for the second result meets a minimum defined confidence value, inserting and storing the core term and the one of the corresponding categories in the hash table and mapping the core term to the one of the corresponding categories in the hash table; and
transmitting the third result to a computer device that generated the search query.

7. The system of claim 6, wherein the logic further implements:
providing the core term to the enrichment module, the enrichment module associating a minimum weight to the core term in the execution of the enrichment module.

8. The system of claim 6, wherein the logic further implements:
upon determining the core term from the search query is not listed in the hash table, providing a synonym of the core term to the enrichment module, the enrichment module expanding the search query to include the synonym.

9. The system of claim 6, wherein the weighted average is applied equally to the first result and the second result based on training data derived from the execution of the reductionist module and the execution of the enrichment module.

10. The system of claim 6, wherein the reductionist module is executed simultaneously with the enrichment module.

11. A computer program product embodied on a non-transitory computer readable storage medium, the computer program product including instructions for causing a computer to execute a method for integrating query categories, comprising:
receiving a search query;
executing a reductionist module on the search query to extract a core term from the search query, the core term used to search a hash table that maps core terms to corresponding categories;
deriving a first result comprising one or more categories from the search of the hash table;
executing an enrichment module on the search query to yield a second result, the enrichment module including searching an index of terms that are mapped to documents and corresponding categories in the index, the second result indicative of one of the corresponding categories in the index based on a probability score;
integrating the first result and the second result to produce a third result, the integrating comprising:
upon determining the core term is present in the hash table, calculating a weighted average for corresponding values of the first result and the second result based on training data acquired from the execution of the reductionist module and the execution of the enrichment module; and
upon determining the core term from the search query is not listed in the hash table, and upon determining the probability score of the one of the corresponding categories in the index for the second result meets a minimum defined confidence value, inserting and storing the core term and the one of the corresponding categories in the hash table and mapping the core term to the one of the corresponding categories in the hash table; and
transmitting the third result to a computer device that generated the search query.

12. The computer program product of claim 11, wherein the method further includes:
providing the core term to the enrichment module, the enrichment module associating a minimum weight to the core term in the execution of the enrichment module.

13. The computer program product of claim 11, wherein the method further includes:
upon determining the core term from the search query is not listed in the hash table, providing a synonym of the core term to the enrichment module, the enrichment module expanding the search query to include the synonym.

14. The computer program product of claim 11, wherein the weighted average is applied equally to the first result and the second result based on training data derived from the execution of the reductionist module and the execution of the enrichment module.

* * * * *